Jan. 22, 1952     E. G. JOHANSSON     2,583,105
ELECTRICAL DISTRIBUTION BOX
Original Filed Sept. 20, 1947     2 SHEETS—SHEET 1

Inventor
Ernest G. Johansson
by Roberts, Cushman & Grover
Att'ys.

Jan. 22, 1952  E. G. JOHANSSON  2,583,105
ELECTRICAL DISTRIBUTION BOX
Original Filed Sept. 20, 1947  2 SHEETS—SHEET 2
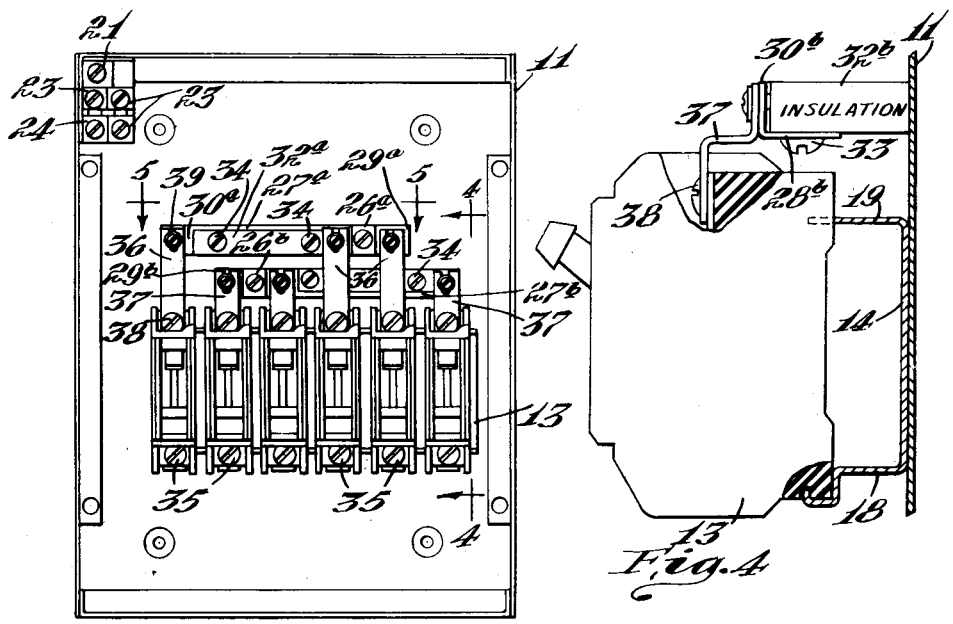
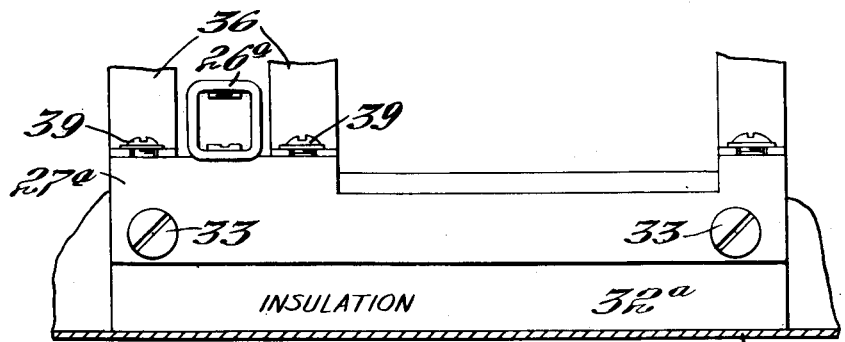
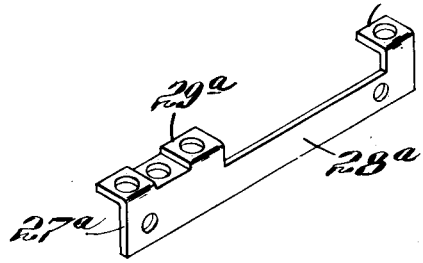
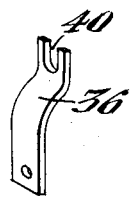
Inventor
Ernest G. Johansson
by Roberts, Cushman & Grover
att'ys.

Patented Jan. 22, 1952

2,583,105

UNITED STATES PATENT OFFICE 2,583,105

ELECTRICAL DISTRIBUTION BOX

Ernest G. Johansson, Belmont, Mass., assignor to Anchor Manufacturing Company, Boston, Mass., a corporation of Massachusetts Original application September 20, 1947, Serial No. 775,349. Divided and this application May 21, 1949, Serial No. 94,659

3 Claims. (Cl. 175—308)

This invention relates to electrical distribution boxes of the type used in a house or an office building to enclose the circuit breakers which connect the main supply circuit to the branch load circuits. The present application is a division of my copending application Serial No. 775,349, filed September 20, 1947, which has become Patent No. 2,542,533.

Objects of this invention are to provide an electrical distribution box which houses a plurality of circuit breakers, which is arranged for readily permitting the removal and installation of the respective circuit breakers, which does not require disconnecting of the main supply circuit to replace the individual circuit breakers, which requires a minimum of parts, which has a simple bus structure for connecting the main supply conductors to the circuit breakers, which minimizes the possibility of short circuits, and which advances the art generally.

In a broad aspect the invention contemplates a distribution box of the type used to connect a plurality of load circuits to an electrical supply circuit by means of respective circuit breakers. The supply circuit is connected to the circuit breakers by bus bars which are attached to the back or other wall of the box. Each of the circuit breakers is held by a respective supporting member which is attached to the box and engages slots provided in the circuit breaker. Conducting straps are provided which perform a dual function, first holding the circuit breakers in position and second completing the electrical connections between the bus bars and the respective circuit breakers.

In another aspect each of the bus bars has flanges of unequal lengths at its respective ends, two bus bars being mounted upon a wall of the box so that the longer flange of each bar is adjacent the shorter flange of the other bus bar. The bus bars are supported in position upon respective insulating blocks secured to the rear wall of the box.

In a more specific aspect the invention contemplates two similar bus bars supported by insulating means, such as a horizontal bar or block of plastic, upon one or more walls of the box and having terminals connected, respectively, to ungrounded sides of the main power supply circuit. Each bar includes a connecting strip having flanges of unequal length at the ends thereof. The connecting strip of one bar is fastened to the top of its supporting insulating block with the flanges extending in front of the face thereof. The other bar is fastened to the bottom of the second insulating block with its flanges extending over the block face so that the longer flange of each bar is adjacent the shorter flange of the other bar. Juxtaposed pairs of circuit breakers are connected to each of the longer flanges, respectively, by means of conducting straps. Each bus bar also has a third circuit breaker connected to its respective shorter flange. This arrangement positions each circuit breaker connected to one of the bus bars adjacent a circuit breaker connected to the other bus bar, thus facilitating conjoint operation of two adjacent circuit breakers to disconnect concomitantly both "hot" conductors of a three wire branch circuit.

For the purpose of illustration, a typical embodiment of the invention is shown in the accompanying drawings in which:

Fig. 3 is a front elevation of the box with the cover removed;

Fig. 4 is an enlarged partial cross-section on line 4—4 of Fig. 5;

Fig. 5 is an enlarged partial cross-section on line 5—5 of Fig. 5;

Fig. 6 is an isometric view of a bus bar;

Fig. 7 is an isometric view of a connecting strap; and

Figure 1:
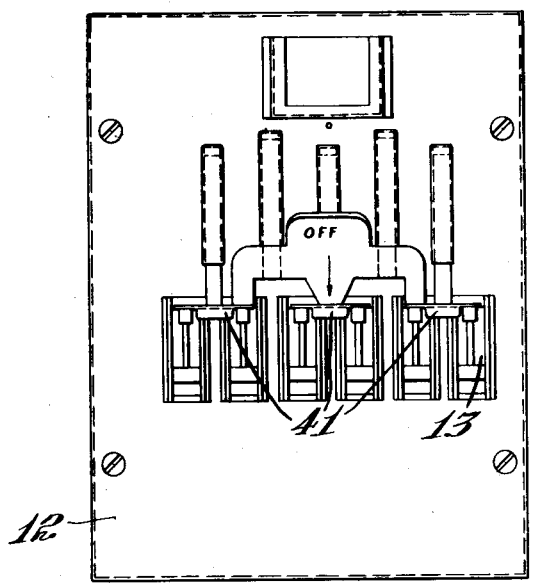
Fig. 1 is a front elevation of a distribution box with the cover in place.
Figure 2:
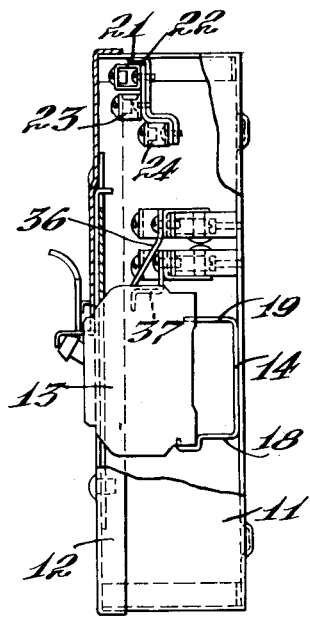
Fig. 2 is a side elevation of the box.

In the particular embodiment of the invention chosen for the purpose of illustration, the distribution box comprises a sheet metal box 11 with a cover 12. Enclosed within box 11 are a plurality of switches such as circuit breakers 13. A clip 14 holds each of the circuit breakers 13 so that its reset handle projects through one of a series of adjacent apertures in the front of cover 12. The clip 14 comprises two arms 18 and 19 supported by a connecting strip which is fastened to the rear wall of the box 11. A hook at the end of arm 18 engages a slot in the bottom of the circuit breaker 13. Additional support is given by arm 19 which projects into a slot in the rear of circuit breaker 13. The engagement of arms 18 and 19 with the slots in the circuit breaker 13 is maintained by straps 36 and 37, the electrical function of which will be described hereinafter.

Figure 8:
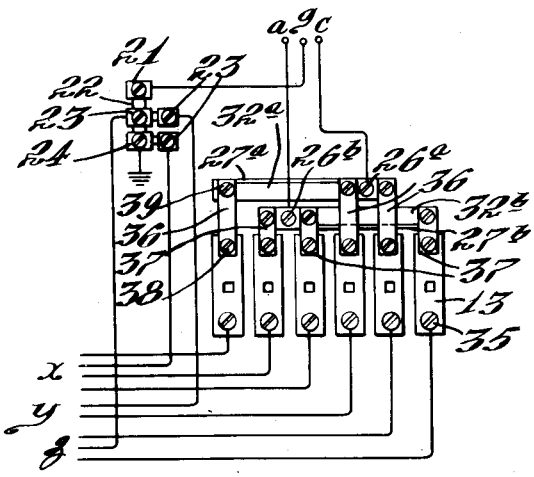
Fig. 8 is the circuit diagram.

As is shown in the wiring diagram Fig. 8, the single phase three-wire power supply circuit comprises two ungrounded wires $a$ and $c$ and a ground wire $g$. Wire $g$ is connected to a terminal 21 which is linked to terminals 23 and 24 by the straps 22. The grounded wires of the load circuits $x$, $y$ and $z$ are connected to the terminals 23, terminal 24 being grounded. The wires $a$ and $c$ are connected to terminals 26$a$ and 26$b$ on bus bars 27$a$ and 27$a$, respectively.

Bus bar 27$a$ (Fig. 6) comprises two flanges 29$a$ and 30$a$ bent at right angles to a connecting strip 28$a$. A block 32$a$ of insulating material supports the bus bar 27$a$. The connecting strip 28$a$ fastens to the top of an insulating block 32$a$ by screws 33 so that the flanges 29$a$ and 30$a$ extend over the front face of the block. The similarly formed bus bar 27b is mounted on an insulating block 32b. The strip 28b is fastened to the bottom of block 32b with the flanges 29b and 30b projecting up over the front of the block. Screws 34 secure the blocks 32a and 32b to the rear wall of box 11. This arrangement permits the use of interchangeable parts for the bus bars 27a and 27b and for the insulating blocks 32a and 32b without interfering with an adjacent positioning of the two circuit breakers 13 associated with each of the load circuits x, y and z.

The strap 36 (Fig. 7) connects one of the circuit breakers 13 in load circuit x to the bus bar 27a. A screw 39 engages a slot 40 in one end of the strap 36a to fasten the strap to the bus bar 27a. A screw 38 in the top of circuit breaker 13 is inserted through a hole in the opposite end of strap 36a. The second circuit breaker 13 in circuit x is connected to bus bar 27b by strap 37 which also has a slotted end for similarly engaging a screw in the bus bar. The circuit breakers 13 in circuits y and z are connected to bus bars 27a and 27b in a similar manner. The slot 40 is cut in one of the ends of straps 36 and 37 so that screw 39 can be loosened and the strap forced upwardly until the circuit breaker 13 can be removed without interrupting the power supply. A terminal 35 at the bottom of each circuit breaker 13 connects with one of the ungrounded wires of each of the load circuits x, y and z.

It will be recognized that the above-described arrangement has several distinct advantages. The bus bars 27a and 27b and the insulating blocks 32a and 32b are identical in construction, thereby reducing the number of separate parts which must be manufactured and also stocked as spare parts. The bus arrangement permits the circuit breakers 13 in each three wire circuits x, y and z to be located adjacent each other so that any one of the circuits may be disconnected by the conjoint operation of its circuit breakers by means of an actuator 41 which is described in detail in my copending application Serial No. 775,349. This box-distribution also permits any of the individual circuit breakers 13 to be removed and another circuit breaker to be substituted therefor without deenergizing the bus bars 27a and 27b and without the danger of loose connecting wires causing a short circuit to the grounded portions of the box.

It should be understood that the present disclosure is for the purpose of illustration only and that this invention includes all modifications and equivalents which fall within the scope of the appended claims.

I claim:

1. A distribution box of the type used to connect an electrical supply circuit to a plurality of load circuits through circuit breakers with reset levers projecting through frontal apertures in the box cover, the box comprising a bus bar supported on a wall thereof and adapted to be connected to the supply circuit, supporting means fastened to the box and engaging slots in said circuit breakers, and a plurality of conducting straps each of which extends from the bus bar to a respective circuit breaker to complete an electrical connection therebetween, said straps being sufficiently rigid to prevent the fastening means from disengaging from the slots thereby to hold the circuit breakers in position and completing the electrical circuit from said bus bars to the respective circuit breakers.

2. A distribution box of the type used to connect an electrical supply circuit to a plurality of load circuits through circuit breakers with reset levers projecting through frontal apertures in the box cover, the box comprising two similar bus bars, each having flanges of unequal lengths at the respective ends thereof, a terminal mounted upon each of the longer flanges and adapted to be connected to a respective ungrounded side of said power supply circuit, said bars being mounted on a wall of said box so that the longer flange of each bar is adjacent the smaller flange of the other bar, a plurality of supporting clips each of which is fastened to the rear wall of the box and is provided with arms for engaging slots in a respective circuit breaker, and conducting straps for holding the circuit breakers in position and concomitantly completing the electrical circuit from said bus bars to the respective circuit breakers whereby juxtaposed pairs of circuit breakers are connected to each of the longer flanges respectively, the conducting straps to the breakers of each juxtaposed pair being connected, respectively, to the portions of the correlated flange adjacent the opposite sides of the power supply circuit terminal mounted thereupon, each bus bar also having a third circuit breaker connected to its respective shorter flange.

3. A distribution box of the type used to connect an electrical supply circuit to a plurality of load circuits through circuit breakers which reset levers projecting through frontal apertures in the box cover, the box comprising two similar bus bars, each including a connecting strip having flanges of unequal lengths at the respective ends thereof, a terminal mounted on each of the lower flanges and adapted to be connected to a respective ungrounded side of said power supply circuit, two insulating blocks horizontally secured to the rear of said box, the connecting strip of one bar being fastened to the top of one block with its flanges extending in front of the face of the bar and the other connecting strip being fastened to the bottom of the second block with its flanges extending in front of the face of the second block whereby the longer flange of each bar is adjacent the shorter flange of the other bar, a plurality of supporting clips, each of said clips being fastened to the rear wall of the box and provided with arms for engaging slots in a respective circuit breaker, and conducting straps for holding the circuit breakers in position and concomitantly completing the electrical circuit from said bus bars to the respective circuit breakers, whereby juxtaposed pairs of circuit breakers are connected to each of the longer flanges respectively, the conducting straps to the breakers of each juxtaposed pair being connected, respectively, to the portions of the correlated flange adjacent the opposite sides of the power supply circuit terminal mounted thereupon, each bus bar also having a third circuit breaker connected to its respective shorter flange.

ERNEST G. JOHANSSON.

REFERENCES CITED

The following references are of record in the file of this patent:

UNITED STATES PATENTS

| Number | Name | Date |
| --- | --- | --- |
| 1,938,309 | Williams | Dec. 5, 1933 |
| 1,958,916 | Hammerly | May 15, 1934 |
| 2,165,203 | Albers | July 11, 1939 |
| 2,261,987 | Frank | Nov. 11, 1941 |
| 2,343,178 | Frank | Feb. 29, 1944 |
| 2,372,083 | Johansson | Mar. 20, 1945 |